Oct. 8, 1935.  E. L. DILLON  2,016,960
BAIT
Filed July 13, 1934

Enos L. Dillon, INVENTOR
BY Victor J. Evans & Co.
ATTORNEY

Patented Oct. 8, 1935

2,016,960

UNITED STATES PATENT OFFICE 2,016,960

BAIT

Enos L. Dillon, Butternut, Wis.

Application July 13, 1934, Serial No. 735,068

1 Claim. (Cl. 43—39)

This invention relates to an artificial fishing bait and has for the primary object the provision of a device of the above stated character which may be constructed to imitate any desired fish, animal or insect and provides a device wherein fish will be attracted thereto and has fish hooks completely concealed or covered thereby to render the device weedless and prevent catching thereof into snags and similar objects.

Another object of the invention is the provision of an inflatable body to cover and conceal the hooks and which will readily puncture and collapse by a fish's mouth engaging therewith so that the hooks may catch into the fish.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a bait constructed in accordance with my invention.

Figure 1:
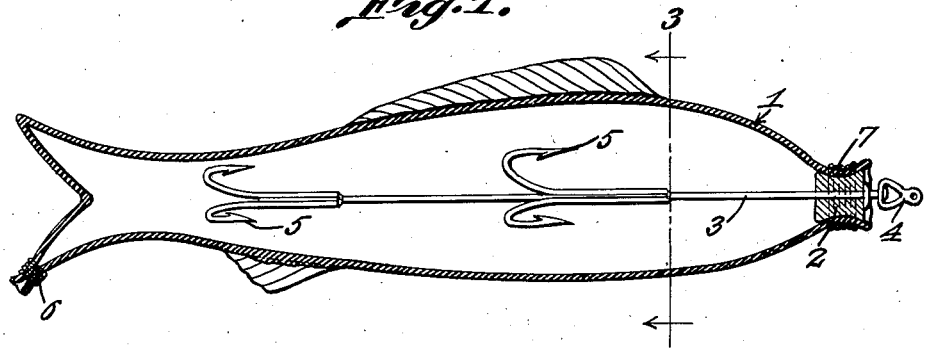

Referring in detail to the drawing, the numeral 1 indicates a body of any desired shape or configuration to imitate live bait and is constructed of very thin rubber or similar material which may be inflated and will readily puncture and collapse when engaged by a fish's mouth. Secured in one end of the body is a spool 2 providing a mounting for a rod 3 which extends substantially the full length of the body and also exteriorly of said body and carries a swivel 4 to which a fish line may be connected. The spool 2 supports the rod centrally of the body and said rod has secured thereto a series of fish hooks 5 which are spaced from the walls of the body when the latter is inflated, the body being provided with a suitable means 6 whereby the body may be inflated with a desired air pressure. The body may be secured to the spool 2 by wrappings 7 or any other means suitable for the purpose and the inflating means 6 is shown as an opening in the body which closed by a suitable wrapping 10 to prevent the escape of air. If desired, the inflating means may be in the form of a suitable valve. The body when inflated may be drawn through the water or cast and will be absolutely weedless due to the fact that the hooks are completely covered and when the body is grabbed by a fish the walls of the body will be compressed against the hooks penetrating said walls and permitting the body to collapse bringing the hooks in contact with the mouth of the fish.

Figure 2:
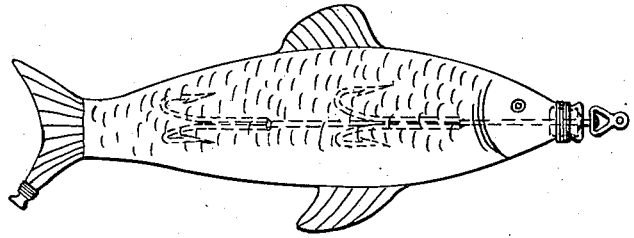
Figure 2 is a side elevation illustrating the same.
Figure 4:
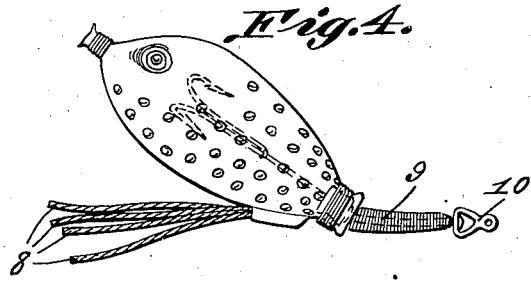
Figure 4 is a side elevation illustrating a modified form of my invention.
Figure 3:
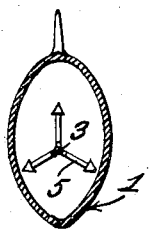
Figure 3 is a sectional view taken on the line 3—3 of Figure 1.

The body, as shown in Figure 2, is in the shape of a small fish. However, the body may be of other desired shapes, as for instance, as shown in Figure 4 the body represents the shape of a bug's body and has extending therefrom a series of flexible elements 8 which may represent or imitate the wings or legs of the bug. As shown in Figure 4, a flexible leader 9 may be connected to the spool and carry at its free end a swivel 10 for connection to the fishing line.

Having described the invention, I claim:

A bait comprising a rod, a spool mounted on the rod at one end of the latter, hooks rigidly connected to the latter, an inflatable covering of destructible material having an opening to permit said covering to be placed over the hooks and rod with the spool positioned in the opening, wrappings securing the covering to the spool, said covering having an inflating opening, and wrappings secured about the covering at the inflating opening to close the latter.

ENOS L. DILLON.